Nov. 8, 1932.  R. H. CARR ET AL  1,887,011

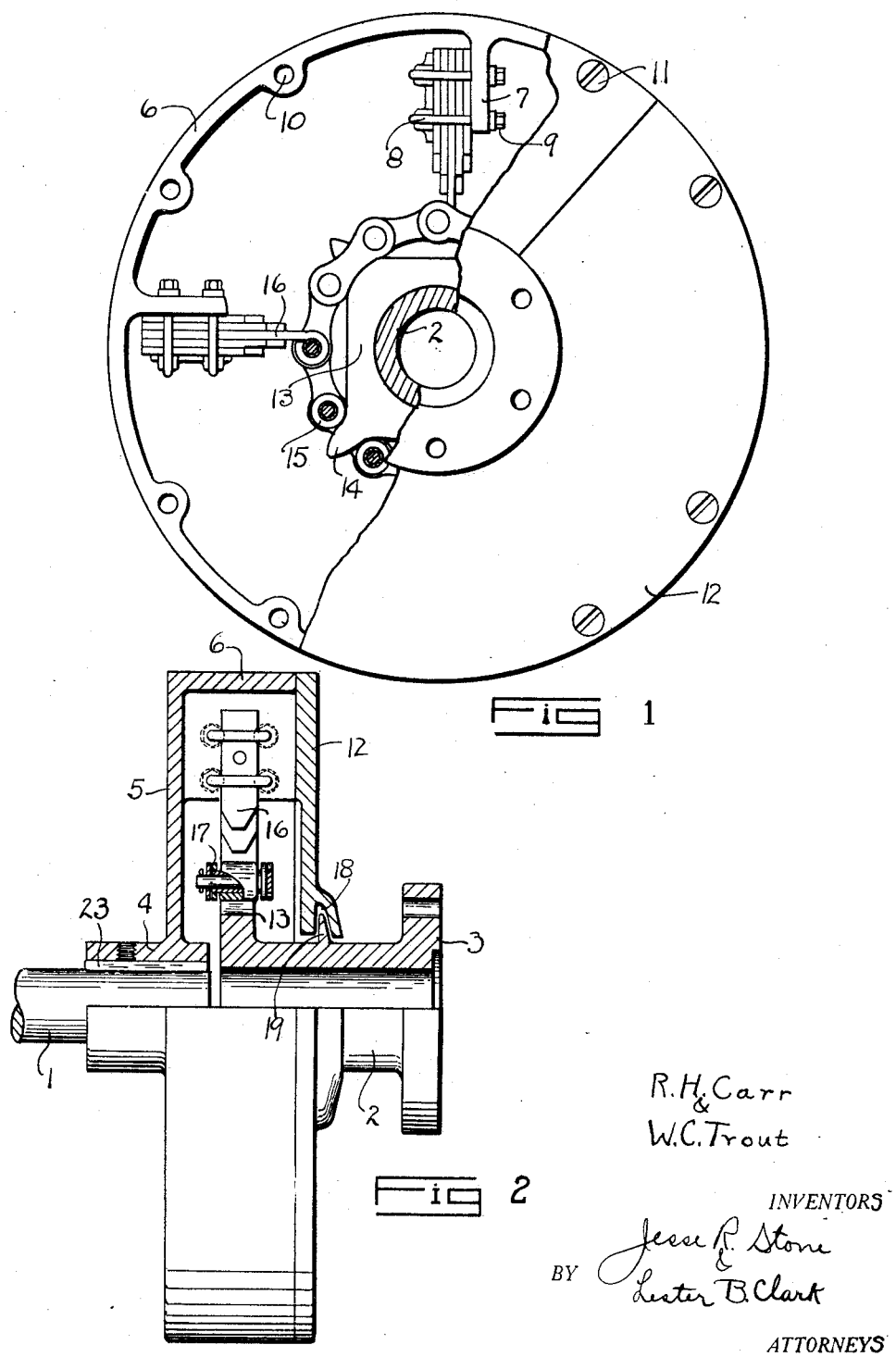

SHOCK ABSORBING COUPLING

Filed Sept. 2, 1930  2 Sheets-Sheet 2

R. H. Carr
&
W. C. Trout
Inventors

By Jesse R. Stone
& Lester B. Clark
Attorneys

Patented Nov. 8, 1932

1,887,011

UNITED STATES PATENT OFFICE

RICHARD H. CARR, OF CHICAGO, ILLINOIS, AND WALTER C. TROUT, OF LUFKIN, TEXAS

SHOCK ABSORBING COUPLING

Application filed September 2, 1930. Serial No. 479,232.

Our invention relates to a driving connection between shafts. It is designed to transmit rotation from one shaft to another shaft aligned or approximately aligned therewith.

It is an object of the invention to provide a coupling of the character noted which will allow slight misalignment of the adjacent shafts without injury to the mechanical device upon which it is used, the invention forming a type of universal driving connection.

We also aim to form a shock absorbing coupling so that an irregular or slightly intermittent driving effort may be transmitted from one shaft to the other without shock or material vibration. The device is intended to absorb the shock communicated from a single cylinder gas engine or the like, and to take up irregularities in the movement of the driving shaft.

In the drawings herewith two embodiments of the invention are shown. Fig. 1 is an end elevation of the device, a portion of the housing being broken away.

Fig. 2 is a side view partly in elevation and partly in central vertical section of the coupling.

Figure 3:
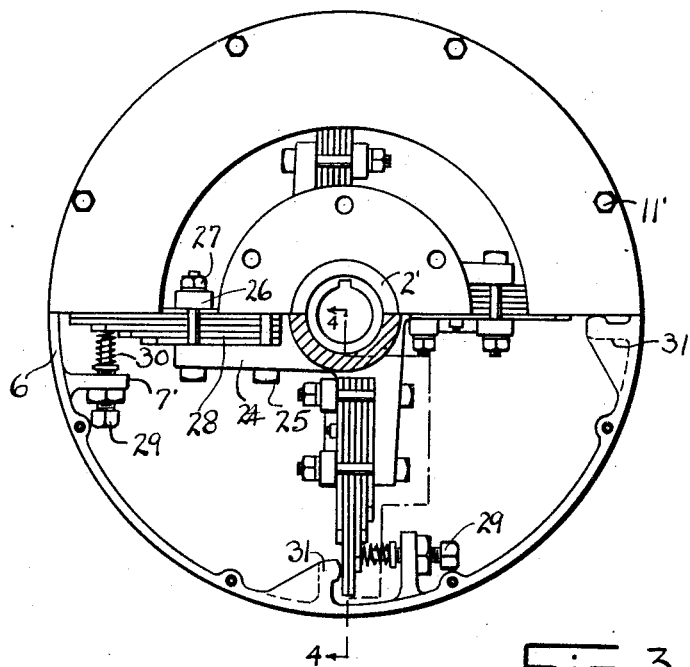
Fig. 3 is a side view similar to Fig. 1 showing a different embodiment of the invention.

The device is designed to transmit a rotation from a shaft 1, connected with some prime mover such as a gas engine, to another driven member such as a shaft or other similar mechanical part. We have shown a sleeve or hollow rotating member 2 as being adapted to be thus rotated. It is understood that a second shaft may be keyed within the said sleeve 2 if desired; or a rotatable device may be secured to a radial flange 3 on said sleeve, or manifestly, the motor may communicate rotation from the sleeve to the shaft 1.

The shaft 1 is keyed at 23 to the hub 4 of a plate or housing 5, which has a flange 6 extended beyond the edge thereof to partially enclose our coupling device. As will be seen from Fig. 1, the flange 6 has a plurality of inwardly projecting arms or webs 7 with openings therein to receive a pair of U-shaped yokes 8, the ends of which project through said arms and have thereon clamping nuts 9 by means of which said yokes may be held in position. There are also screw sockets 10 in the flange 6 to receive screws 11 which serve to secure an annular plate 12 in position, closing the open side of the housing.

The sleeve 2 has a sprocket wheel 13 thereon within the housing, closely adjacent the end of the shaft 1. We have shown four teeth on this sprocket wheel, said teeth 14 being adapted to engage with a sprocket chain 15, which encircles the wheel. The said wheel may be made integral with the sleeve 2 as shown.

The connection between the housing 5, which is rotatable with the shaft 1, and the sleeve 2 is made through spring members 16. Said springs may be the usual type of leaf spring shown, in which the main leaf of resilient metal is reenforced on each side by shorter plates. This group of plates are secured together and to the arms 7 on the housing by the yokes 8 previously described. The inner end of the spring is curved to receive a bolt or shackle 17 which forms one of the pivot pins in the sprocket chain 15 secured to the wheel 13. It will be seen that there may be several of the spring connecting members. We provide for four of them, the inner end of each being secured to the sprocket chain as described.

The plate 12, when placed in position, closes the housing and protects the coupling from dust and the elements. The inner rim of the plate is shown as grooved at 18 to receive a short ridge or flange 19 on the sleeve 2, thus providing for a rotatable interfitting of the housing and the sleeve 2 to keep out foreign material.

In operation the rotation of the housing by the shaft 1 may transmit movement to the sleeve 2 or vice versa, through the springs 16 and the sprocket wheel 13 and chains 15. This driving connection takes up vibration or shocks due to spasmodic or irregular action from the driving shaft. It allows for irregularities in the load handled, taking the shock off the driving mechanism. Likewise, inaccurate alignment of the shaft 1 and the sleeve 2 will be allowed for by the flexibility of the connection thus provided. Obviously this connection allows driving effort to be delivered from the sleeve 2 to the shaft 1 or from the shaft to the sleeve and the invention is adapted generally for wide application.

Figure 4:
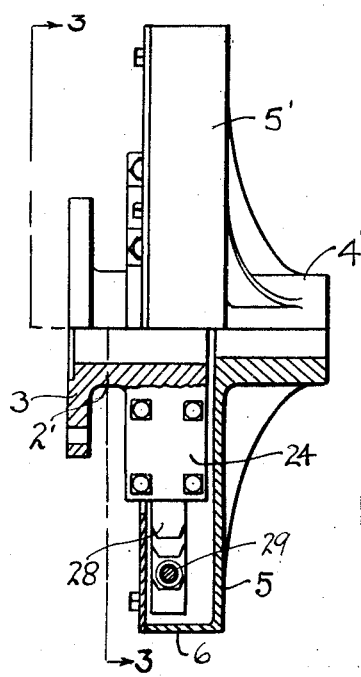
Fig. 4 is a side view partly in section of the embodiment shown in Fig. 3.

In Figs. 3 and 4 we have shown a different embodiment of the invention. In this form the shaft 1 is adapted to fit within the sleeve or hub 4' as in the preceding embodiment. This hub is formed on a housing 5', similar in most respects to the housing 5. This housing has a driving connection with a hub or sleeve 2' having thereon a flange for connection with an adjacent operated device. The connection between the driving and driven member is made through arms 24 upon the hub or sleeve 2'. These arms extend tangentially from the hub 2', as shown best in Fig. 3. Each of the arms is provided with openings to receive bolts 25 which extend through said arms to engage with bars 26, held in place by nuts 27. Said bars are intended to clamp leaf spring members 28 to said arms, allowing said leaf springs to project outwardly from the hub to a point closely adjacent the housing 5'.

Formed on the rim 6 of the housing 5' are arms 7', which act as supports for the outer ends of said springs. A bolt or screw 29, extending through each of said arms, is adapted to project to a point adjacent the ends of said springs. Mounted upon the bolt 29 and between the arms 7' and the springs is a coil spring 30, said spring bearing upon the leaf spring 28 and serving as a shock-absorbing buffer. The end of the screw or bolt 29 acts as a stop member to prevent undue compression of the spring 30.

As shown in Fig. 3, there are four of the arms 21, although the exact number of arms is not material. Each arm bears between the ends of the bolt or screw 29 and a stationary lug 31. In this way a shock-absorbing means is provided between the driving member and the driven member, the arrangement being the reverse of that shown in the first embodiment.

What we claim as new is:

1. A shock absorbing coupling of the character noted including a rotatable member, a sprocket wheel thereon, a sprocket chain encircling said wheel, a second rotatable member, a supporting plate thereon, and resilient arms on said plate connected at their inner ends to said chain.

2. A shock absorbing coupling of the character noted including a rotatable member, a sprocket wheel thereon, a sprocket chain encircling said wheel, a second rotatable member in approximately end alignment with the first member, a housing secured to said second member, and arms on said housing extending inwardly for connection with said chain.

3. A shock absorbing coupling of the character noted including a rotatable member, a sprocket wheel thereon, a sprocket chain encircling said wheel, a second rotatable member, a radial plate thereon, an annular flange on said plate and a resilient connection between said arms and said chain.

4. A coupling between a shaft and a rotatable member in end alignment therewith, including a sprocket wheel on said member, a sprocket chain on said wheel, a housing on said shaft surrounding said wheel, and resilient means on said housing engaging with said chain to form a driving connection therewith.

5. A coupling of the character stated including aligned shafts, a sprocket wheel on the end of one of said shafts, a flanged plate secured to the adjacent end of the other of said shafts, inwardly extending spring arms on said plates, and a sprocket chain encircling said sprocket wheel and connected with the ends of said spring arms.

In testimony whereof I hereunto affix my signature this 6th day of August, A. D. 1930.

WALTER CHARLES TROUT.

In testimony whereof I hereunto affix my signature this 11th day of August, A. D. 1930.

RICHARD H. CARR.